United States Patent [19]

Goers

[11] Patent Number: 4,501,724

[45] Date of Patent: Feb. 26, 1985

[54] METHOD FOR THE WET PROCESS MANUFACTURE OF PHOSPHORIC ACID

[75] Inventor: Walter E. Goers, Briarcliff Manor, N.Y.

[73] Assignee: Goers Associates Inc., Hawthorne, N.Y.

[21] Appl. No.: 575,903

[22] Filed: Feb. 1, 1984

[51] Int. Cl.³ ............................................. C01B 25/16
[52] U.S. Cl. ..................................... 423/320; 423/167
[58] Field of Search ................ 423/320, 321 R, 321 S, 423/522, 166, 167

[56] References Cited

U.S. PATENT DOCUMENTS

| | | | |
|---|---|---|---|
| 3,003,852 | 10/1961 | Nordengren | 423/166 |
| 3,030,200 | 4/1962 | Harris | 423/522 X |
| 3,161,467 | 12/1964 | Hignett et al. | 423/320 |
| 3,391,996 | 7/1968 | Van Dijk et al. | 423/320 |
| 3,420,628 | 1/1969 | Robinson | 423/320 |
| 3,801,566 | 4/1974 | Elmendorp et al. | 260/239.3 A |
| 3,829,560 | 8/1974 | Fornoff et al. | 423/522 |
| 3,886,259 | 5/1975 | Nikolai et al. | 423/166 |
| 4,154,800 | 5/1979 | Cannon et al. | 423/320 |
| 4,258,008 | 3/1981 | Gragg | 422/189 |

*Primary Examiner*—Gregory A. Heller
*Attorney, Agent, or Firm*—Roland T. Bryan

[57] ABSTRACT

An improved method for the wet process manufacture of concentrated phosphoric acid is disclosed herein. A mixture of gaseous sulfur trioxide and sulfuric acid now replaces concentrated sulfuric acid as a process reactant which results in a higher heat of reaction and the ability to evaporate out of the reaction slurry increased inputs of water. With this method the increased inputs of water, either from undried phosphate rock, wet grinding of phosphate rock, use of dilute sulfuric acid, or from other sources will not interfere with associated high $P_2O_5$ yields, lower concentrations of filtrate phosphoric acid and/or unbalance the zero steam requirements.

13 Claims, 4 Drawing Figures

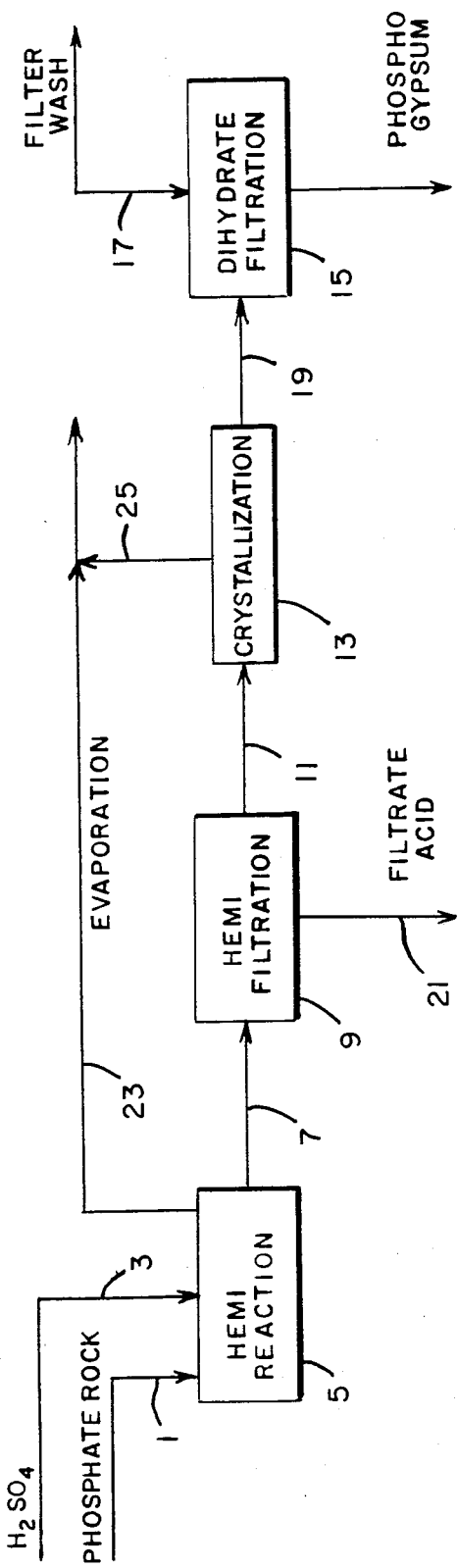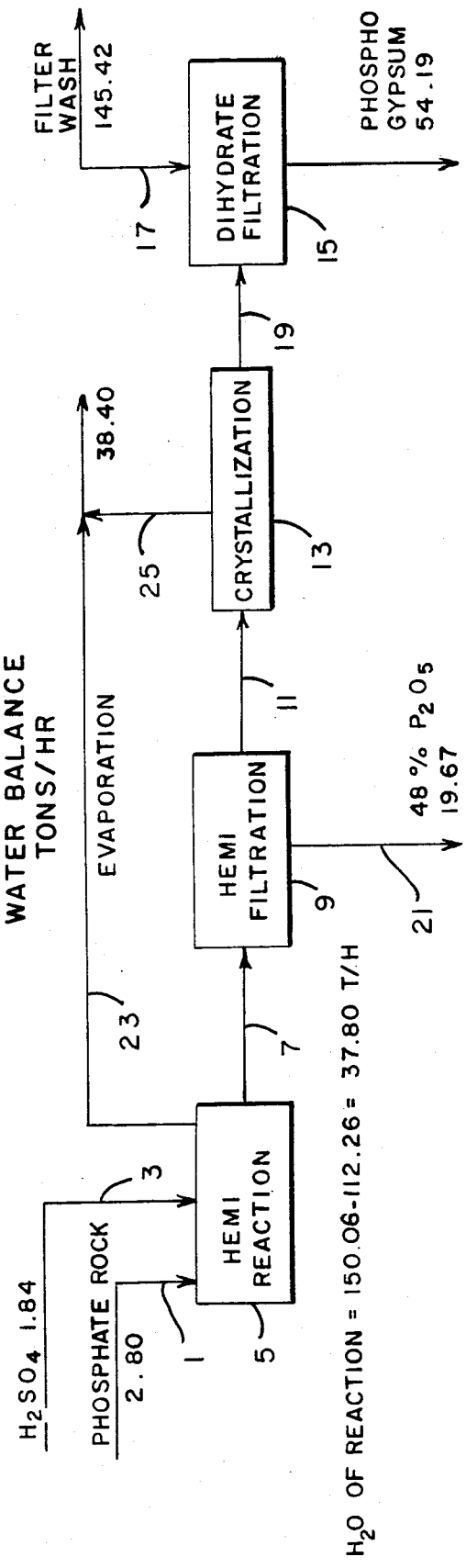

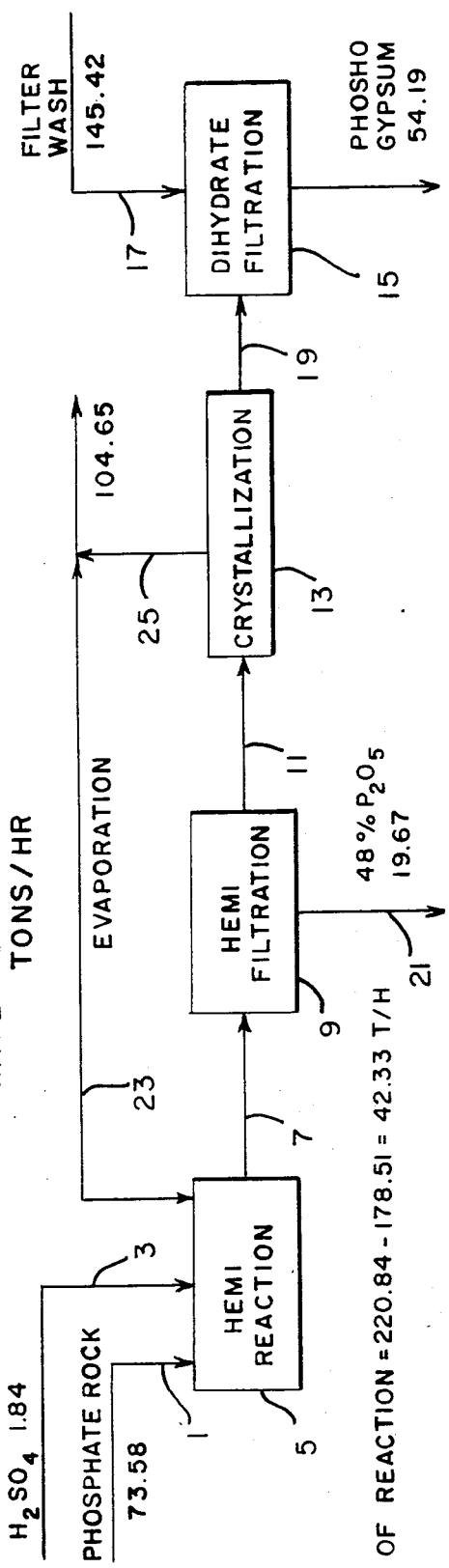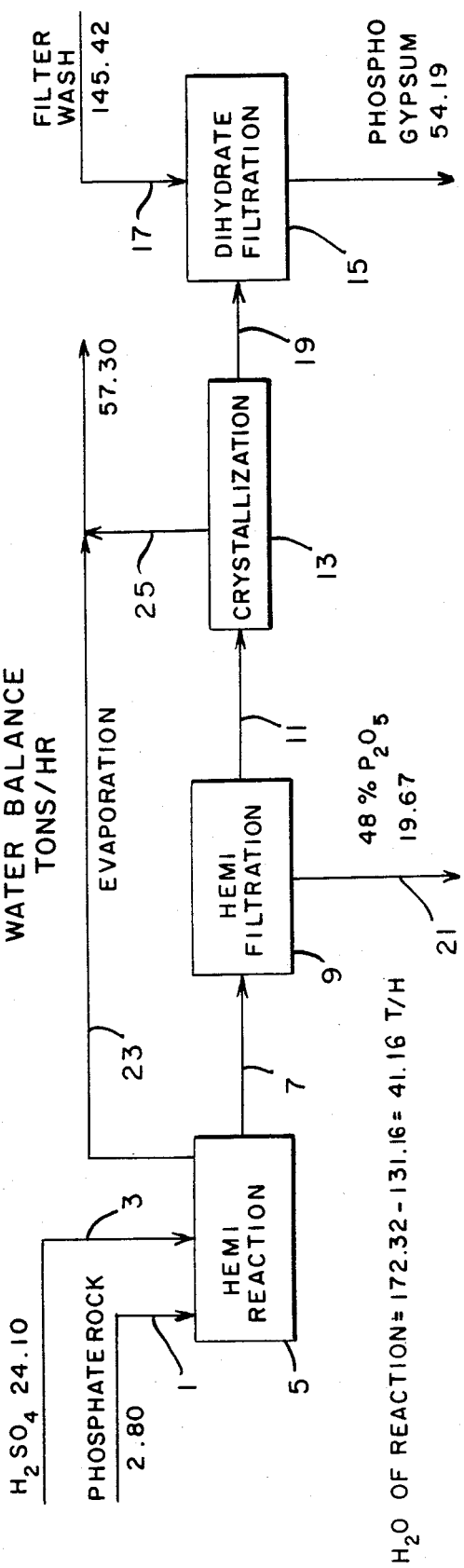

4,501,724

METHOD FOR THE WET PROCESS MANUFACTURE OF PHOSPHORIC ACID

BACKGROUND OF THE INVENTION

The wet process manufacture of phosphoric acid has been used for many years. The wet process involves the reaction of phosphatic solid materials, hereinafter termed phosphate rock, wherein calcium sulfate, monocalcium phosphate, phosphoric acid and sulfuric acid comprise the usual reaction media. The names of the three processes for the production of phosphoric acid by the wet process are based on the by-product calcium sulfate produced; namely, the gypsum or dihydrate process, the hemihydrate process, and the anhydrite process. Wherein the type of the by-product is dependent upon a number of factors, most importantly, the temperature of the process system and the $P_2O_5$ concentration of the liquid phase of the slurry. For better control of that reaction temperature, $P_2O_5$ concentration in the slurry, and higher $P_2O_5$ yields, it has been a common practice to predry the phosphate rock before grinding to the proper reaction size. Any moisture introduced with the phosphate rock reduces the filtrate wash water and lowers $P_2O_5$ yields thereby since evaporation of water is limited by the associated heat of reaction and dilution.

The BPL contents of commercially available phosphate rock ranges between 60% to 80%, with better grades of rock being rapidly depleted. Wherefore, high energy costs for drying and more rigid pollution effluent requirements have and are causing the phosphate industry to change to a practice of wet grinding the phosphate rock. The present method of wet phosphate rock grinding results in a phosphate slurry of about 65% solids and 35% water. With this increased water quantity to the phosphoric acid plant, the water balance problem even for present low filtrate phosphoric acid concentrations of 26-27% $P_2O_5$ becomes extremely more difficult. Plants, employing wet phosphate rock grinding, have had to lower the wash water to the filter in an effort to increase the concentration of filtrate phosphoric acid. But this decrease in wash water input results in lower $P_2O_5$ yields as the water balance within the process becomes critical.

It is therefore an object of the present invention to provide an improved method of wet process phosphoric acid production wherein increased inputs of water, either from undried phosphate rock, wet grinding of phosphate rock, use of dilute sulfuric acid, or from other sources will not interfere with associated high $P_2O_5$ yields, lower concentrations of filtrate phosphoric acid and/or unbalance the zero steam requirements.

It is a further object of the present invention to allow for the use of increased inputs of water, either from undried phosphate rock, wet grinding of phosphate rock, use of dilute sulfuric acid, or from other sources whereby increased yields of concentrated phosphoric acid are achieved without changing the wet process reaction plant or procedure so as to be readily incorporated into existing production facilities.

It is a still further object of the present invention to allow for the use of increased inputs of water either from undried phosphate rock, wet grinding of phosphate rock, use of dilute sulfuric acid, or from other sources whereby increased yields of concentrated phosphoric acid are achieved and a substantial reduction in electrical and heat energy consumption is realized.

SUMMARY OF THE INVENTION

The present invention is directed to a method for the wet process manufacture of concentrated phosphoric acid wherein increased inputs of water, either from undried phosphate rock, wet grinding of phosphate rock, use of dilute sulfuric acid, or from other sources, will not interfere with associated high $P_2O_5$ yields and/or lower concentrations of filtrate phosphoric acid and/or zero steam requirements.

With the present invention, it has now become possible to practice wet process phosphoric acid manufacture, produce high concentrations of filtrate phosphoric acid and still maintain high $P_2O_5$ yields without upsetting the plant water balance.

Heretofore, the first step in producing phosphoric acid by the wet process was that after the grinding of the dried phosphate rock, the phosphate rock was then mixed with strong sulfuric acid (usually 93-98% concentrated) and digested into a slurry therein. This concentrated sulfuric acid being supplied at ambient or slightly elevated temperatures of 150°-200° F.

It has now been discovered that if instead of using concentrated sulfuric acid as a reactant, gaseous sulfur trioxide is substituted for part of that acid normally used, a higher heat of reaction results which is able to evaporate off excess water present. Thus, water laden phosphate rock is now able to be processed without drying or wet phosphate rock grinding can be employed. Even more importantly, with this invention, the present dihydrate chemistry for the manufacture of phosphoric acid can be changed to the hemihydrate chemistry which brings with it much higher yields of $P_2O_5$ (98.5%) and more concentrated filtrate phosphoric acid (50% $P_2O_5$). Without this invention wet grinding of phosphate rock would not be economically feasible with the practice of the hemihydrate phosphoric acid process. Even present dihydrate operating phosphoric acid plants can benefit by this invention as additional wash water can be used on the filter and the water balance difficulties associated with wet ground phosphate rock can be alleviated.

Another important feature of the present invention is the reduced cooling water requirements at the sulfuric acid plant for absorption of the sulfur trioxide to sulfuric acid. This possible heat source is transferred to the cooling water and then lost to the atmosphere. With the present invention that heat of absorption from the sulfur trioxide transition to sulfuric acid is recovered in the phosphoric acid plant which allows for the savings of fuel by not drying the phosphate rock.

The invention together with further objects and advantages thereof will be better understood from a consideration of the following detailed description of the preferred embodiment.

DESCRIPTION OF THE DRAWING

FIG. 1, is a flow diagram illustrating the typical process steps as used in a Double Filtration Wet Process Hemihydrate Plant.

FIG. 2, is a flow diagram illustrating the water balance for a wet process hemihydrate phosphoric acid plant using dried phosphate rock (2% water) and 98% sulfuric acid.

FIG. 3, is a flow diagram illustrating the water balance for the wet process of Example 1 assuming wet grinding of phosphate rock.

FIG. 4 is a flow diagram illustrating the water balance for the wet process of Example 1 assuming 80% sulfuric acid.

DESCRIPTION OF THE PREFERRED EMBODIMENT

FIG. 1 is a flow diagram illustrating the typical process steps as used in a Double Filtration Wet Process Hemihydrate Plant. This representation is for illustration purposes only and not meant to be limiting thereto, as the subject invention works and is useable equally well with all wet process manufacturing techniques, including single and double filtration hemihydrate and dihydrate processes.

Referring now to FIG. 1, phosphate rock and the sulfuric acid and sulfur trioxide mixture are fed via lines 1 and 3, respectively, to the hemi-reaction mixture vessel 5. The control of flow into said vessel 5, being unimportant and able to be regulated by any suitable regulating means. Water evaporated from the slurry within reaction vessel 5 is removed via line 23. The acid slurry from reaction vessel 5, is then fed via line 7 into the hemi-filter 9, wherein most of the phosphoric acid is removed via line 21 by filtering. The solids from filter 9, are then fed via line 11 to crystallization container 13, where the hemihydrate crystals are dissolved and the calcium sulfate is reprecipitated out as the dihydrate form of the salt. In this process step phosphoric acid mother liquor and occluded $HPO_4$ ions are recovered as a weak phosphoric acid filtrate stream for internal recycle. Excess water evaporating from the mixture is removed via line 25. Calcium sulfate crystals are then fed via line 19 to the dihydrate filter 15, wherein the filter cake is washed by filter wash 17 to remove any remaining phosphate mother liquor in the phospho-gypsum.

As used in FIG. 1, the phosphate rock, has been ground to a predetermined size mesh. It is reported and generally understood that a larger particle size phosphate rock is permitted with the hemihydrate process chemistry. In some instances, the phosphate rock will not have to be ground. However, unground phosphate rock even contains up to 15% by weight free water which would still interfere with the feasible operation of a hemihydrate type plant. With the use of undried unground phosphate rock, the amount of gaseous sulfur trioxide would be reduced accordingly from that amount needed with wet grinding.

Moreover, the phosphate rock of FIG. 1, does not necessarily have to be dried to remove water accompanying said rock. While heretofore this water would have been removed either by furnace drying the rock before grinding or by filter vacuum dewatering the wet ground rock filter cake before adding to reaction vessel, with the present invention said water removal is unnecessary.

As stated above, included with the phosphate rock in the mixture vessel 5 is the sulfuric acid and gaseous sulfur trioxide mixture. Due to the large demand for sulfuric acid in the wet process manufacture of phosphoric acid (almost one ton of sulfur, as sulfuric acid, for each ton of phosphate), it is a common practice to have a sulfuric acid plant adjacent to the phosphoric acid plant.

Within said plant, most sulfuric acid is made by the contact process, in which sulfur dioxide produced by burning elemental sulfur (or a sulfur-containing mineral) in air is oxidized to sulfur trioxide by a suitable catalyst such as vanadium pentoxide. The sulphur trioxide is absorbed in strong sulfuric acid to produce highly concentrated sulfuric acid—up to 100% sulfuric acid or even higher. The principal reactions are:

$$S + O_2 \rightarrow SO_2 \tag{A}$$

$$SO_2 + \tfrac{1}{2}O_2 \rightarrow SO_3 \tag{B}$$

$$SO_3 + H_2O \rightarrow H_2SO_4 \tag{C}$$

The large amounts of heat generated by the exothermic (A) and (B) can be recovered in a waste-heat boiler to raise steam, which can be used in the sulfuric acid plant and also for evaporation and other purposes in the associated phosphoric acid unit.

In the present invention the stream, fed into reaction vessel 5, is actually a mixture of the products of the equations (B) and (C). As the product (B) sulfur trioxide is an intermediate product in the sulfuric acid production process, it is then only a matter of diverting a portion of the gaseous sulfur trioxide (B) to combine with the sulfuric acid (C) to be fed as stream 3 into the reaction vessel 5. As gaseous sulfur trioxide is at 400°–500° F., the mixture as fed into vessel 5 is a combination of heated gaseous sulfur trioxide and the sulfuric acid.

It has been found that the exact proportion of gas to acid will depend on the amount of water introduced into the reaction system and the specific type of wet process phosphoric acid technology employed.

It has also been found that the concentrations of sulfuric acid are also no longer as critical as they have heretofore been known to be. Therefore, if there was available a source of dilute sulfuric acid of about 80% acid, it is no longer necessary to concentrate that acid before it can be used, as the presence of the higher heat of reaction will evaporate out any dilution water creating the necessary acid concentration.

In order that those skilled in the art may better understand how the present invention can be practiced and more fully understood the following examples are given. These examples are given by way of illustration and are not meant to be limiting in any way. The quantities used represent typical production runs and have been calculated by standard formulations known in the art.

FIG. 2 indicates the water balance for the conventional production of 1000 tons/day $P_2O_5$ as wet process phosphoric acid product. Such a high yield hemihydrate plant requires 3280 tons/day of dry 68 BPL phosphate rock and 2700 tons/day of sulfuric acid (dry basis) using dried phosphate rock and concentrated sulfuric acid. In said process dried phosphate rock (2% water) is fed to reaction vessel 5 at a rate 136.67 tons/hr incorporating with it 2.80 tons/hr of water. To be mixed with said rock in reaction vessel 5 is 98% sulfuric acid at a rate of 90.33 tons/hr incorporating with it 1.84 tons/hr of water. With said reactant a yield of 41.67 tons/hr of $P_2O_5$ can be expected from the hemi-filtration 9 with the total water evaporated from reaction vessel 5 and crystallization container 13 being 38.40 tons/hr of water.

FIG. 3 indicates the water balance for the production of 1000 tons/day $P_2O_5$ as wet process phosphoric acid product wherein wet ground phosphate rock is fed to digestor 5 as 65% (rock)-35% (water) by weight slurry after grinding. The total daily phosphate and acid consumption requirements being the same as for FIG. 2

(3280 and 2700 tons/day, respectively). Except now, the sulfur feed stream 3 will be a mixture of 98% sulfuric acid and a gaseous sulfur trioxide effluent stream from the economizer outlet of the associated sulfur burning sulfuric acid plant. This sulfur trioxide gaseous stream at 450° F. will have the following composition:

| ITEM | WT % |
|---|---|
| Sulfur Dioxide | 0.56 |
| Sulfur Trioxide | 22.13 |
| Oxygen | 7.60 |
| Nitrogen | 69.71 |

The gaseous effluent 23 from the digester will be at 190° F. and 90% saturated.

By the above raw material feeds to the wet process phosphoric acid plant, heat and material balance, the following actual flow quantities will be indicated.

| ITEM | Tons/Hr | SCFM |
|---|---|---|
| Phosphate Rock (Dry) | 136.67 | |
| Water (35%) | 73.58 | |
| Sulfuric Acid (Dry) | 90.33 | |
| Water (2%) | 1.84 | |
| Sulfur Trioxide (Gaseous Stream) | 18.08 | 31,000 |

Wherefore, the total water evaporated from reaction vessel 5 and crystallization container 13 will now be 104.65 tons/hr with the same yield of $P_2O_5$ as that indicated in FIG. 2.

A theoretical explanation of the identical yields without upsetting the balance is as follows. The heat of reaction of sulfuric acid with phosphate rock is known to be 417 BTU/lb of 68 BPL phosphate rock. While the corresponding heat of reaction for sulfur trioxide with phosphate rock is 468 BTU/lb of 68 BPL. The heat from cooling gaseous sulfur trioxide stream to digestion temperature is an additional 193 BTU/lb of 68 BPL phosphate rock. Thus the total heat release from the use of gaseous sulfur trioxide is 661 (468 plus 193) BTU/lb of 68 BPL phosphate rock. This results in a 59% increase of available heat of reaction from using only sulfuric acid as compared to using the sulfuric acid and sulfur trioxide mixture. It is this additional heat which is able to evaporate off the additional water present while maintaining the requisite water balance for the desired high phosphoric acid yield. While it is a fact that the $H_2O$ of reaction balance (input-output) is greater in FIG. 3 than in FIG. 2, this difference is the result of conversion of $SO_3$ to $H_2SO_4$ but compensates minimally for the additional water present with the wet ground rock. Without evaporating off said excess water, the resultant yield and concentration would be reduced and would ultimately require further processing by heat evaporation to reach economically handlable concentrations.

To further demonstrate the present invention again assume the production of a 1000 T/D $P_2O_5$ as wet process phosphoric acid product as shown in FIG. 4. The phosphate rock will now be fed as a dry ground material having 2% (wt.) of water. The sulfur feed streams will be a mixture of dilute 80% (wt.) sulfuric acid and a gaseous sulfur trioxide effluent stream from the economizer outlet of the associated sulfur burning sulfuric acid plant at 450° F. The composition of the gaseous stream will be the same as in FIG. 3. The gaseous effluent from the digester will be at 150° F. and 80% saturated.

By the above raw material feeds to the wet process phosphoric acid plant, heat and material balance, the following actual flow quantities will be indicated:

| ITEM | Tons/Hr | SCFM |
|---|---|---|
| Phosphate Rock (Dry) | 136.67 | |
| Water (2%) | 2.80 | |
| Sulfuric Acid (Dry) | 96.40 | |
| Water (20%) | 24.10 | |
| Sulfur Trioxide (Gaseous Stream) | 13.13 | 22,500 |

Wherefore, the total water evaporated will be 57.30 tons/hr with the same yield of $P_2O_5$ as that indicated in FIGS. 2 and 3.

Again it is noted that the same high yield has been maintained while evaporation of an excess of almost 20 tons/hr of water from the conventional setup of FIG. 2 has been achieved.

While the present invention has been described in connection with the preferred embodiment thereof, it is to be understood that additional embodiments and modifications which will be apparent to those skilled in the art are included within the spirit and scope of the invention as described in the specification and set forth in the appended claims.

I claim:

1. In the wet process manufacture of phosphoric acid from phosphate rock wherein the phosphate rock is reacted with a concentrated acid reagent to yield concentrated phosphoric acid, the improvement in the process comprising the step of:

reacting the phosphate rock with an effective amount of acid reagent for yielding phosphoric acid wherein said reagent is comprised of a mixture of sulfuric acid and gaseous sulfur trioxide, the gaseous sulfur trioxide being added in an effective amount so as to cause the evaporation of excess water in the feed streams by the release of heat from the reaction between the sulfur trioxide gas and the rock.

2. A process according to claim 1 wherein the gaseous sulfur trioxide is part of the gaseous mixture typically obtained from a contact sulfuric acid plant 3. A process according to claim 1 wherein the phosphate rock is predried to a moisture content of 0–3% moisture.

4. A process according to claim 1 wherein phosphate rock is undried and typically contains 5–15% moisture.

5. A process according to claim 1 wherein phosphate rock is wet ground to a resulting slurry typically 65% rock and 35% water.

6. A process according to claim 1 wherein phosphate rock is wet ground to a slurry and then dewatered to 12–20% water content.

7. A process according to claim 1 wherein said reagent mixture comprises 20–95% sulfuric acid and 5–80% gaseous sulfur trioxide.

8. A process according to claim 7 wherein sulfuric acid concentration ranges from 50–98% by weight.

9. A process according to claim 7 wherein the gaseous sulfur trioxide is comprised of sulfur dioxide 0.56%, sulfur trioxide 22.13%, oxygen 7.60%, nitrogen 69.71%.

10. A process according to claim 1 wherein the manufacturing process of phosphoric acid employs dihydrate phosphate chemistry.

11. A process according to claim 1 wherein the manufacturing process of phosphoric acid employs single filtration hemihydrate phosphate chemistry.

12. A process according to claim 1 wherein the manufacturing process employs double filtration hemi-dihydrate phosphate chemistry.

13. A process according to claim 1 wherein the manufacturing process of phosphoric acid employs anhydrite phosphate chemistry.

* * * * *